United States Patent Office 2,700,015
Patented Jan. 18, 1955

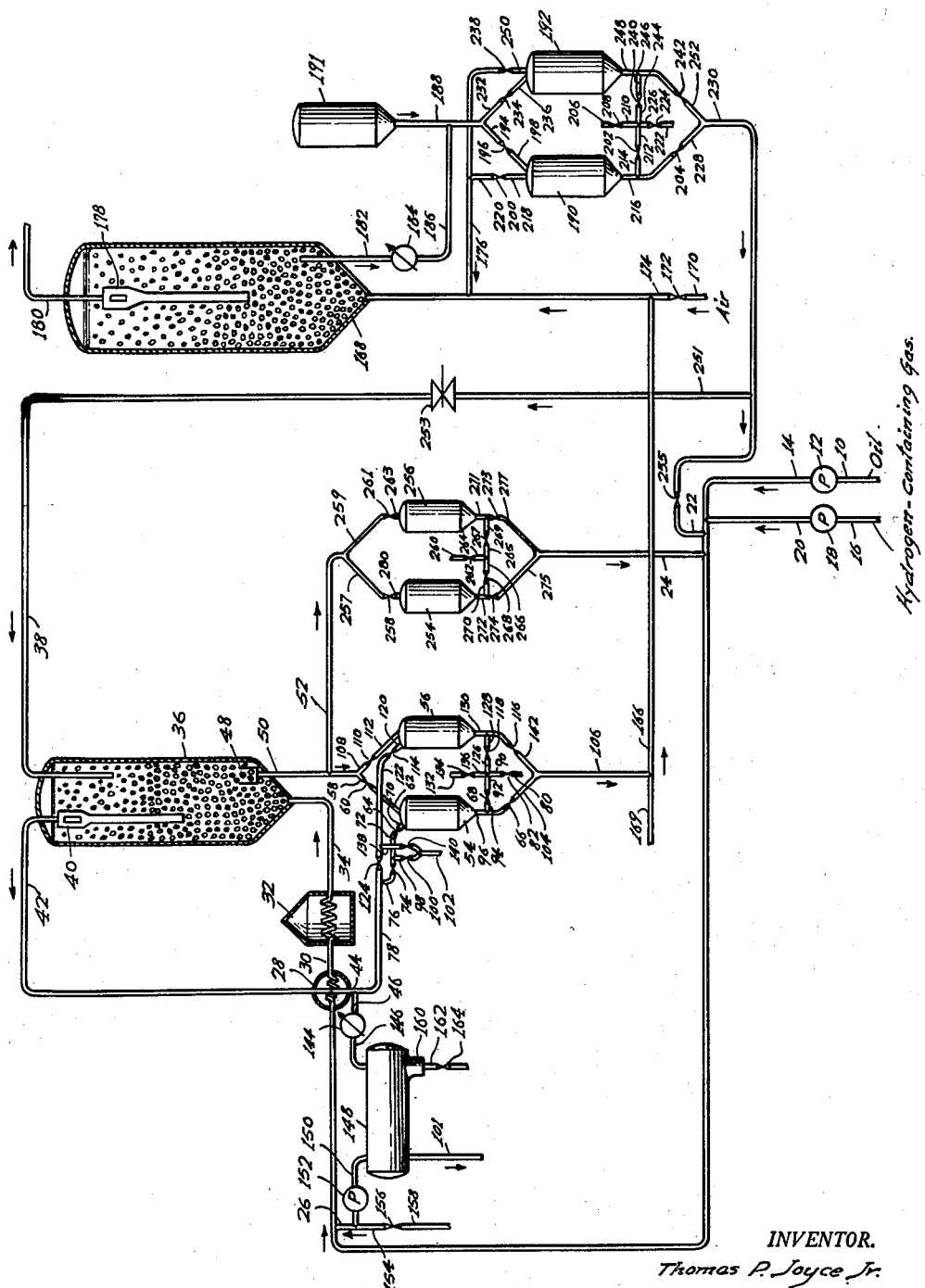

2,700,015

HIGH PRESSURE FLUID HYDROGENATION PROCESS

Thomas P. Joyce, Jr., Cheswick, Pa., assignor to Gulf Research & Development Company, Pittsburgh, Pa., a corporation of Delaware Application November 10, 1950, Serial No. 195,061

3 Claims. (Cl. 196—53)

This invention relates to a high pressure fluid hydrogenation process and more particularly, to a process for hydrogenating a high-boiling liquid hydrocarbon charge in the presence of hydrogenation catalyst at an elevated pressure.

The prior art has encountered several serious problems in attempting to apply fluidized procedure to the high pressure hydrogenation of difficultly vaporizable charges, such as high-boiling liquid petroleum hydrocarbons. Among the most serious of these has been the problem of effectively regenerating the fluidized catalyst, as regenerating the catalyst at the elevated reaction pressure requires extraordinary equipment made of special alloys which renders the cost of the equipment excessive. Regeneration of the hydrogenation catalyst at low pressures is a feature of this invention, which also provides means for decreasing the equipment erosion and catalyst attrition encountered when attempting to transport solid catalyst particles from a high pressure zone to a low pressure zone. Furthermore, an additional serious problem involved in regenerating the catalyst is the presence of entrained hydrogen-containing gas with the deactivated catalyst. This entrained hydrogen-containing gas constitutes an explosion hazard when the deactivated catalyst is passed to an oxidative regeneration stage.

As a result of difficulties such as those mentioned above, fluidized catalyst type procedure has never been commercially adopted for pressurized hydrogenation type processes. Instead, the pressurized hydrogenation procedures heretofore described have been the various fixed bed catalytic methods, which have suffered from the disadvantages concomitant with employing fixed bed procedure. Thus, unlike fluidized catalyst type practice in which the composition of the product does not appreciably vary and the regeneration catalyst temperature does not fluctuate widely, these fixed bed methods have encountered serious problems in product control and temperature regulation. Furthermore, these hydrogenation procedures have utilized the same vessel for both the on-stream hydrogenation reaction and the catalyst regeneration. As a result, the on-stream factor for each reactor is but of the order of about 50 per cent since it is necessary to have the reactor out of service for regeneration. This has required the number of reactors to be increased practically twofold to obtain the desired capacity. In addition, the extraordinarily high temperatures encountered in regeneration require that these vessels be constructed from expensive alloy materials, which combined with the fact that these vessels must also be constructed of high pressure alloys, renders the cost of construction of each vessel exceedingly high.

A further disadvantage which is characteristic of both fluid and fixed bed type processes which have been proposed arises because the heavy charge stocks undergo some decomposition while being heated to the temperatures necessary for their introduction into the reactor. This decomposition when purely thermal tends to yield coke either in the heating equipment or in the catalytic reactor, and moreover the lighter liquid hydrocarbons produced by thermal decomposition are not as valuable as those produced in the catalytic hydrogenation.

The present invention relates to a continuous high pressure fluid hydrogenation process for high-boiling hydrocarbon charge stocks wherein the disadvantages characteristic of the previously proposed processes are at least substantially overcome. The process is carried out in a reaction system comprising a reaction zone in which the charge stock is contacted with a fluidized hydrogenation catalyst at high pressure and temperature, and a regeneration zone in which catalyst from the reaction zone is regenerated, preferably at substantially atmospheric pressure. Catalyst is continuously transported from the reaction zone to the regeneration zone.

My invention is applicable to the hydrogenation of high-boiling liquid petroleum hydrocarbon charges and includes such various hydrogenation reactions as: hydrocracking, destructive hydrogenation, absorption hydrodesulfurization, and catalytic hydrodesulfurization. These reactions are conducted under elevated pressures such as superatmospheric pressures of the order of between about 250 and 2000 pounds per square inch. By a high-boiling liquid petroleum hydrocarbon charge I mean a charge comprising a petroleum hydrocarbon, or mixture of petroleum hydrocarbons, which is a liquid under normal conditions, and which is relatively difficultly vaporizable. Examples of this type charge include: total crude such as a Baxterville, Mississippi crude or a West Texas crude or a Kuwait crude; topped or reduced crude; or a high-boiling petroleum fraction; or equivalent high-boiling hydrocarbon liquids from other sources. Minor amounts of diluents such as naphthas may sometimes be added to these charge feeds to improve their flow characteristics.

As illustrative of my invention I shall describe it as applied to a hydrodesulfurization process although it is to be understood that my invention is generally applicable to other fluidized hydrogenation reactions performed under elevated pressures which utilize high-boiling petroleum charges.

In the accompanying figure which is hereby incorporated into my application and made a part thereof, a sulfur-containing high-boiling difficultly vaporizable liquid petroleum hydrocarbon such as one of those previously mentioned, e. g. a total crude, topped or reduced crude or a high boiling petroleum fraction is introduced by means of line 10 into feed pump 12. In feed pump 12 the charge is pressurized to substantially the elevated reaction pressure. I have found it advantageous to pressurize the charge and the other constituents entering my process to somewhat above the reaction pressure, in order to compensate for any pressure drop across the equipment located prior to the reactor. For most hydrodesulfurization reactions I have found that the desirable on-stream reaction pressure should be of the order of between about 250 and 2000 pounds per square inch, and preferably between 500 and 1000 pounds per square inch. The pressurized liquid hydrocarbon charge passes from feed pump 12 to line 14 where it is joined by pressurized fresh hydrogen-containing gas which has entered the system after passing through line 16, hydrogen gas pressurizing pump 18 and line 20.

In accordance with an embodiment of the invention, catalysts from the reaction zone and minor amounts of hydrogen-containing gas are flowed through line 24 and combined with the oil charge and hydrogen-containing gas in line 14. When heating the resulting mixture, as will later be described, thermal decomposition is retarded and in many cases mild catalytic conversion of the charge is begun in advance of the reaction zone. The catalyst from the reaction zone, which is conveniently referred to as deactivated catalyst but is actually an equilibrium catalyst mixture, is preferably combined with the charge as catalyst of this reduced activity does not cause an undesired amount of conversion in advance of the reactor. Advantage is also gained by combining the charge flowing in line 14 with active catalyst such as make-up or regenerated hydrogenation catalyst from line 22 in place of, or in addition to the deactivated catalyst from the reactor. When the major part of the make-up and/or regenerated catalyst is added directly to the reactor, the catalyst added to the charge should be relatively small in amount, to avoid any possibility of excessive conversion in advance of the reactor. The entire amount of catalyst introduced into the reactor can, however, be mixed with the charge. If this is done, best results are obtained by assuring that the time period during which the mixture is maintained at an elevated temperature in advance of the reactor is relatively short as otherwise a substantial part of the catalytic reaction may occur under the poorly controlled conditions existing in the system in advance of the reactor.

By "hydrogenation catalyst" I mean those catalysts which are conventionally used for hydrogenation of petroleum hydocarbons such as: the iron group metals, and the iron group compounds such as the iron group metal oxides, either singly or in combination; the group VI metals such as molybdenum or tungsten, and the group VI compounds such as molybdenum or tungsten oxides or sulfides; or combinations of the group VI and iron group metals and/or compounds. To the above may also be added amounts of further elements, compounds, and the catalysts may be supported on carriers, such as synthetic silica-alumina composites, alumina, diatomaceous earth, aluminum silicates, etc.

As I have indicated, the catalyst which may be added from lines 22 and/or 24 should be in a finely divided state so that it may be maintained in a suspended turbulent state within the reactor. The mixture of hydrogen-containing gas, oil charge, as well as any catalyst from lines 22 and/or 24 is joined in line 14 by recycle hydrogen-containing gas from line 26. The mixture then passes through heat exchanger 28, line 30 into heater 32. Within heater 32 the mixture is raised to the reaction temperature. I have found that while a broad range of reaction temperatures may advantageously be used in my hydrodesulfurization process, the optimum results are secured with an on-stream reaction temperature of between about 750° and 950° F. The heated mixture passes from heater 32 through line 34 into catalytic reactor 36. As previously indicated, active pressurized finely divided hydrogenating catalyst can also be added to reactor 36 from line 38. Preferably at least a major portion of the catalyst should usually be added in this manner.

Within reactor 36 the hydrogenation catalyst is maintained in a suspended turbulent state. The high-boiling portions of the charge are catalytically converted into lower-boiling substances, and the sulfur content of the charge is removed by being converted into gaseous hydrogen sulfide or in the case of sulfur adsorption type catalysts such as the iron group metal or metal oxide catalysts, adsorbed on the surface of the catalyst as iron group metal sulfide. Concomitantly the catalyst becomes deactivated with the deposition upon its surface of carbonaceous contaminants, and in the case of adsorption catalyst with sulfur contaminants as well. The reaction products, unreacted charge and unreacted hydrogen-containing gas, as well as the hydrogen sulfide, if any, are removed from the top of reactor 36 through cyclone separator 40. The entrained catalyst fines within these products are removed by cyclone separator 40 and returned to the reactor. Any catalyst fines not separated by cyclone separator 40 may be recovered by means of a scrubber or by other conventional catalyst fines recovery equipment (not shown). The products are transferred through line 42, heat exchanger 28 and line 44 into line 46 from which they undergo further treatment as will be described later.

Deactivated catalyst is withdrawn from reactor 36 through catalyst draw-off 48 and passes into line 50. From line 50 a minor portion of the deactivated catalyst can be drawn off through line 52. The major portion of the deactivated catalyst remaining within line 50 is transferred to either lock chamber 54 or 56. Thus, if the catalyst is passed to lock chamber 54 it leaves line 50 through line 58, valve 60 and line 62 from which it enters lock chamber 54. Valves 64, 66 and 68 are closed. After the deactivated catalyst has filled lock chamber 54 valve 60 is closed and lock chamber 54 is isolated from reactor 36. Valve 64 is then opened permitting the entrained product vapors, unreacted charge and hydrogen-containing gas to be removed from lock chamber 54 through line 70, valve 64, line 72, valve 74, line 76 and line 78 from which they join the products from reactor 36 and are treated as will be described later. The entrained hydrocarbons and hydrogen-containing gas are stripped from the catalyst by means of a hydrogen purge effected by having hydrogen-containing gas enter lock chamber 54 through line 80, valve 82, lines 90 and 92, valve 68, lines 94 and 96. The purged hydrocarbon products are removed through line 70 and valve 64 as has heretofore been described. This hydrogen purge is followed with a purge by a further gas such as an inert gas like steam to remove the entrained hydrogen-containing gas. Thus, the inner gas enters lock chamber 54 from line 132, valve 134, lines 136 and 92, valve 68, and lines 94 and 96. After passing through the catalyst within lock chamber 54, the inert gas, hydrogen-containing gas and entrained hydrocarbons may be vented through line 70, valve 64, lines 72 and 98, valve 100, and line 102.

Alternatively, in place of the foregoing procedure the catalyst could be allowed to settle in lock chamber 54 and the entrained reaction products, hydrogen-containing gas and unreacted feed removed by venting through line 70, valve 64, lines 72 and 98, valve 100 and line 102, and then followed by the inert gas purge as has heretofore been described. After the catalyst has been purged and the last portion of the purge vented through line 102, valve 64 is closed, and the catalyst is passed from lock chamber 54 through line 96, valve 66, line 104 into line 106.

It is desirable in order to maintain a continuous process that either lock chamber 54 or 56 be filling or purging while the other lock chamber is discharging catalyst. Thus if lock chamber 54 is discharging catalyst it is necessary that the catalyst in line 50 be passed to lock chamber 56 rather than lock chamber 54. Accordingly, catalyst is removed from line 50 through line 108, valve 110 and line 112 from which it enters lock chamber 56. Valves 114, 116 and 118 are closed. After the catalyst has filled lock chamber 56, valve 110 is closed and lock chamber 56 is isolated from reactor 36. The entrained hydrocarbons, unreacted charge and hydrogen-containing gas are stripped from the catalyst by means of a hydrogen purge effected by having hydrogen-containing gas enter lock chamber 56 from line 80, valve 82, lines 90 and 126, valve 118, lines 128 and 130. The entrained products, unreacted charge and hydrogen-containing gas are removed from lock chamber 56 through line 120, valve 114, line 122 and valve 124 from which they pass into line 78 and are treated in conjunction with the products from reactor 36 as will be described below. This hydrogen purge is followed with a further purge using an inert gas such as steam which is passed from line 132 through valve 134, lines 136 and 126, valve 118, lines 128 and 130 into lock chamber 56. The inert gas purge may be vented by passing through line 120, valve 114, lines 122 and 138, valve 140 and line 102.

Alternatively, in place of the foregoing procedure the catalyst could be allowed to settle in lock chamber 56 and the entrained reaction products, hydrogen-containing gas and unreacted charge removed by venting through line 120, valve 114, lines 122 and 138, valve 140 and line 102. This venting is followed with an inert gas purge using an inert gas such as steam from line 132 which is also vented through line 102 as has heretofore been described. After the catalyst has been purged and the last portion of the purge vented through line 102, valve 114 is closed and the catalyst is passed from lock chamber 56 through line 130, valve 116 and line 142 into line 106.

The products and unreacted gases from reactor 36 in line 44 and the purged entrained products and gases from lock chamber 54 or 56 in line 78 are passed through line 46, condenser 144, and line 146 into high pressure separator 148. From high pressure separator 148 recycle hydrogen-containing gas is passed as overhead through line 150 and pressurized to substantially reaction pressure by means of pump 152. From pump 152 the recycle hydrogen-containing gas passes through line 26 and joins the charge mixture in line 14. Portions of this recycle hydrogen-containing gas may be bled from the system by means of line 154, valve 156 and line 158.

The bottoms from high pressure separator 148 are removed by means of line 101 from which they pass to a low pressure flash drum, hydrogen-producing unit, and other processing equipment (not shown) for further separation of the products, and the conversion of gaseous hydrocarbon contaminants into hydrogen-containing gas. Any slop bottoms from high pressure separator 148 are removed by means of slop separator 160, line 162 and valve 164.

The depressurized catalyst from line 106 is passed to line 166 where it is joined by a regenerative fluidizing gas such as air which enters from line 169. Catalyst is passed in a suspended turbulent state with the fluidizing gas through line 166 into regenerator 168. Additional regenerative gas is added to the catalyst in line 166 from line 170, valve 172 and line 174. The inert gas stream and any catalyst fines from line 176 can also be added to line 166.

The pressure within regenerator 168 is of the order of atmospheric such as between about 1 and 5 atmospheres. The temperature within regenerator 168 is usually somewhat above the reaction temperature and may be of the order of 1000° to 1200° F. The carbonaceous contaminants plus sulfur contaminants, if any, are removed by oxidative combustion so that the carbonaceous contaminants become converted to oxides of carbon and the sulfur contaminants, if any, to sulfur dioxide. Spent regenerative gases and regenerative gas products are removed from regenerator 168 through cyclone separator 178 which returns any entrained catalyst particles to the lower portion of regenerator 168. From cyclone separator 178 these regenerative products and spent gases are removed from the system through line 180.

The regenerated catalyst is removed from regenerator 168 and passes through line 182 and cooler 184, in which it is cooled from the higher regeneration temperature to substantially the reaction temperature of the order of 750° to 950° F., and then into lines 186 and 188. In line 188, the regenerated catalyst is joined by make-up catalyst from catalyst make-up vessel 191.

The catalyst in line 188 may be passed to either lock chamber 190 or lock chamber 192. Thus, if regenerated catalyst is to be passed to lock chamber 190 it leaves line 188 through line 194, valve 196, and line 198 from which it enters lock chamber 190. Valves 200, 202, and 204 are closed. After the catalyst has filled lock chamber 190, valve 196 is closed and the entrained regenerative gases are purged from the catalyst by means of an inert gas such as steam which enters lock chamber 190 from line 206, valve 208, lines 210 and 212, valve 202, lines 214 and 216. The inert gas, purged regenerative gas and a minor amount of catalyst are removed from lock chamber 190 through line 218, valve 200, lines 220 and 176 from which the mixture enters line 166 and is processed as has heretofore been described. After the regenerative gas has been purged from lock chamber 190 the catalyst is pressured-up to substantially reaction pressure by closing valve 200 and introducing hydrogen-containing gas into lock chamber 190 from line 222, valve 224, lines 226 and 212, valve 202, and lines 214 and 216. The pressurized catalyst plus a minor amount of hydrogen is then removed from lock chamber 190 through line 216, valve 204 and line 228 into line 230.

It is desirable in order to maintain a continuous process that either lock chamber 190 or lock chamber 192 be filling or purging while the other lock chamber is discharging catalyst. Thus, if lock chamber 190 is discharging catalyst to line 230 it is necessary that lock chamber 192 be either in the filling or purging stage. To accomplish this, catalyst is passed from line 188 through line 232, valve 234 and line 236 into lock chamber 192. Valves 238, 240 and 242 are closed. After the catalyst has filled lock chamber 192, valve 234 is closed and the entrained regenerative gases and products are removed through the passage of an inert purge gas such as steam from line 206 through valve 208, lines 210 and 244, valve 240, lines 246 and 248 into lock chamber 192. The combined mixture of spent regenerative gases and inert purge gas plus a minor amount of catalyst is passed out of lock chamber 192 through line 250, valve 238 and line 176 from which it is returned to regenerator 168 by means of line 166. After the regenerative gas has been purged from the catalyst, valve 238 is closed and the catalyst is pressured-up to substantially reaction pressure with hydrogen-containing gas from line 222, valve 224, lines 226 and 244, valve 240, and lines 246 and 248. The pressurized catalyst then passes from lock chamber 192 through line 248, valve 242, line 252 into line 230. From line 230 the active pressurized catalyst may be passed through line 251, flow control valve 253, line 38 into reactor 36. Depending upon the operator a portion or all of the catalyst in line 230 may be recirculated to the charge mixture in line 14 by passing through valve 255 and line 22.

The minor portion of deactivated catalyst and entrained products and hydrogen-containing gas which can be removed from line 50 is passed through line 52 into either lock chamber 254 or 256. In order to maintain a continuous process it is desirable that either lock chamber 254 or 256 be filling or processing while the other is discharging catalyst. If lock chamber 254 is being filled, the catalyst and entrained products and hydrogen-containing gas pass from line 52 through line 257, valve 258, and line 280 into lock chamber 254. When lock chamber 254 becomes full of catalyst, valve 258 is closed, and hydrogen-containing gas from line 260, valve 262, lines 264 and 266, valve 268, lines 270 and 272 is passed into lock chamber 254. This hydrogen-containing gas pressurizes the catalyst to the pressure existing within line 14, which as previously indicated can be somewhat greater than the pressure within reactor 36 by virtue of a pressure drop across the process equipment prior to the reactor. When the appropriate pressure has been attained, the catalyst is removed from lock chamber 254 through line 272, valve 274, lines 275 and 24 from which it enters line 14.

If lock chamber 254 is discharging catalyst then lock chamber 256 should be in the filling or processing stage. Thus the catalyst and entrained products and hydrogen-containing gas pass from line 52 through line 259, valve 261 and line 263 into lock chamber 256. When lock chamber 256 becomes full of catalyst, valve 261 is closed and hydrogen-containing gas from line 260, valve 262, lines 264 and 265, valve 267, lines 269 and 271 pass into lock chamber 256. This hydrogen-containing gas pressurizes the catalyst to the pressure existing within line 14. When the appropriate pressure has been attained, the catalyst is removed from lock chamber 256 through line 271, valve 273, lines 277 and 24 from which it enters line 14.

I have found that preferred results can be achieved when the catalyst to oil weight ratio is maintained between about 1:2 and 1:16. For optimum yields with high-boiling charges I have found that it is preferable to recirculate the entire body of active catalyst directly to the reactor, while simultaneously adding a minor portion of deactivated catalyst to the charge so as to form a deactivated catalyst-charge slurry. Thus, for example, I have found it advantageous to recirculate about 10 per cent by weight of the deactivated catalyst removed from the reactor to the charge to form the slurry. By recirculating this deactivated catalyst there will be a material decrease in the quantity of carbonaceous contaminants formed before and within reactor 36 during the hydrogenation reaction stage, and a deeper conversion of the high-boiling charge constituents. While I do not wish to be bound by any theory of interpretation for these results, it is my belief that the presence of this deactivated catalyst in the charge while it is being heated to reaction temperature in some manner inactivates the coke-forming constituents of the charge and renders the high-boiling constituents of the charge more prone to the action of the hydrogenation catalyst.

While the foregoing description of my process constitutes the preferred operating procedure it is obvious that my process may be modified by one skilled in the art. It is to be understood that these modifications constitute part of my invention and are to be considered as included within the appended claims. By way of example, in place of recycling all of the active catalyst directly to a reactor, a major portion, or all of it may be recycled to the reactor in the form of a slurry with the charge. Alternatively, and preferably, the major portion or all of the active catalyst may be transported directly to the reactor. Furthermore, while in the preferred form of my invention a portion of the deactivated catalyst is recirculated in the form of a slurry mixture with the charge to the reactor, in some cases it may be desirable that all of the deactivated catalyst be regenerated without any of it being recycled to the reactor. Moreover, in place of separately withdrawing the catalyst and reaction products from the reactor as set forth in the preferred modification of my invention described above, they may be withdrawn together, separated by means of a cyclone separator, and the catalyst then passed to a lock chamber. Additionally, while I have shown but one reactor being utilized, it is to be understood that a plurality of reactors may be used in combination with one or more regenerators and with one or more sets of lock chambers.

Also, it is to be understood that alternative methods for the introduction of the hydrogen-containing gas and catalyst (where the use of slurry mixtures is contemplated) to the charge may be used. Thus, in some cases it may be desirable to add the hydrogen-containing gas to the charge prior to the addition of the catalyst, whereas in others it may be desirable to first form the catalyst-charge slurry mixture and to then add the hydrogen-containing gas, or the catalyst may be added to hydrogen-containing gas prior to the addition of the charge. Furthermore, in some cases it may be desirable to form a catalyst-charge slurry, pump the slurry to reaction pressure, and add the hydrogen-containing gas. In addition to the foregoing it is to be understood that other conditions of temperature, pressure, catalyst to oil ratio, type catalyst, etc. than those cited in my example may be used in my invention.

The utilization of my invention permits continuous fluidized operation to be employed with pressurized hydrogenation reactions. The catalyst may be withdrawn, regenerated and reutilized. The regeneration may be accomplished at pressures in the neighborhood of atmospheric pressures such as below about 5 atmospheres, whereas the hydrogenation reaction stage may be conducted at greatly elevated pressures. The transfer of catalyst from the high pressure zone to the low pressure zone is accomplished without any appreciable erosion, and without any excessive disintegrative catalyst attrition. Also the explosion hazard due to the presence of hydrogen within the regenerator equipment is eliminated. In addition, the hydrogenation reactors may be used virtually continuously without being withdrawn from service to regenerate the catalyst. Furthermore, a deep conversion of the heavier unvaporizable constituents of the charge may be achieved, as well as uniform product composition characteristics. Moreover, due to the fluidized, operating procedure closer heat controls may be effected.

I claim:

1. A hydrogenation process conducted at an elevated pressure which comprises pressurizing a charge comprising a high-boiling liquid petroleum hydrocarbon charge containing sulfur to substantially the reaction pressure of between about 500 and 1000 p. s. i., adding thereto a finely divided pressurized deactivated hydrogenation catalyst from a catalytic reactor in the hydrogenation reaction stage to form a slurry, heating the slurry plus hydrogen-containing gas to substantially the reaction temperature of between about 750° and 950° F., introducing the heated slurry and hydrogen-containing gas into a catalytic reactor, separately introducing into the catalytic reactor a finely divided pressurized active hydrogenation catalyst, maintaining the finely divided hydrogenation catalyst particles in a fluidized turbulent state suspended in a gaseous phase within the reactor thereby deactivating the catalyst while catalytically converting the charge and removing sulfur from it, removing the reaction products and any unreacted hydrogen-containing gas from the upper portion of the catalytic reactor, withdrawing the deactivated catalyst from the lower portion of the catalytic reactor to a chamber, isolating the chamber to prevent flow of catalyst from the reactor to the chamber, reducing the pressure on the chamber and catalyst therein, transferring the catalyst at a reduced pressure to a regenerator, regenerating a major portion of the withdrawn catalyst to substantially its active form, returning the regenerated catalyst to a catalytic reactor in the hydrogenation reaction stage, and returning the remainder of the withdrawn deactivated catalyst in the form of a deactivated catalyst-charge slurry to a catalytic reactor in the hydrogenation reaction stage.

2. A continuous process for the hydrogenation of a high boiling point hydrocarbon charge at elevated pressures of 250 to 2000 pounds per square inch and a temperature of 750° to 950° F. comprising pressurizing the charge to substantially the elevated pressure, adding a hydrogen-containing gas and finely divided deactivated hydrogenation catalyst to the charge to form a mixture of hydrogen-containing gas and slurry of charge and catalyst, heating the mixture, introducing the mixture plus finely divided active hydrogenation catalyst to a reactor, maintaining the catalyst in the reactor in a fluidized turbulent state suspended in a gaseous phase thereby catalytically hydrogenating the charge, removing reaction products from the reactor, removing dry, finely divided particles of deactivated catalyst from the reactor separately from the reaction products and delivering the deactivated catalyst alternately to a first chamber and a second chamber, isolating the first chamber from the reactor to prevent flow from the reactor to the first chamber, purging the first chamber and catalyst therein of entrained hydrocarbons and hydrogen-containing gas and reducing the pressure in the first chamber to substantially atmospheric pressure, transferring the catalyst from the first chamber at substantially atmospheric pressure to a regeneration zone at substantially atmospheric pressure, delivering catalyst to the second chamber while isolating, purging, reducing the pressure on, and transferring catalyst from, the first chamber and delivering catalyst to the first chamber while isolating, purging, reducing the pressure on, and transferring catalyst from, the second chamber to maintain substantially continuous flow from the reactor, regenerating the catalyst by oxidation of contaminants thereon to form an active catalyst, and pressurizing the regenerated catalyst and returning it to the reactor.

3. A continuous process for the hydrogenation of a high boiling point hydrocarbon charge at an elevated pressure of 250 to 2000 pounds per square inch and a temperature of 750° to 950° F. comprising pressurizing the high boiling point hydrocarbon charge to the elevated pressure, adding a hydrogen-containing gas to the charge, heating the charge to substantially the reaction temperature, introducing the charge plus hydrogen-containing gas to a reactor, maintaining a hydrogenation catalyst in the reactor in a fluidized turbulent state suspended in a gaseous phase thereby catalytically hydrogenating the charge, removing reaction products from the reactor, separately removing dry, finely divided deactivated catalyst from the reactor, recycling a portion of the deactivated catalyst to the charge at a point prior to the heating of the charge to form a slurry of the charge and deactivated hydrogenation catalyst whereby a slurry of charge and deactivated hydrogenation catalyst is heated in the presence of hydrogen-containing gas, delivering the remainder of the removed deactivated catalyst alternately to a first chamber and a second chamber, isolating the first chamber from the reactor to prevent flow from the reactor to the first chamber, purging the first chamber and catalyst therein of entrained hydrocarbons and hydrogen-containing gas and reducing the pressure in the first chamber to substantially atmospheric pressure, transferring the catalyst from the first chamber at substantially atmospheric pressure to a regeneration zone at substantially atmospheric pressure, delivering catalyst to the second chamber while isolating, purging, reducing the pressure on, and transferring catalyst from, the first chamber and delivering catalyst to the first chamber while isolating, purging, reducing the pressure on, and transferring catalyst from, the second chamber to maintain substantially continuous flow from the reactor, regenerating the deactivated catalyst at substantially atmospheric pressure by oxidation of contaminants thereon, and repressuring and recycling the regenerated catalyst to the reactor.

References Cited in the file of this patent

UNITED STATES PATENTS

| Number | Name | Date |
|---|---|---|
| 1,845,058 | Pier | Feb. 16, 1932 |
| 1,933,508 | Peck | Oct. 31, 1933 |
| 1,940,651 | Semmes | Dec. 19, 1933 |
| 1,949,630 | Russell et al. | Mar. 6, 1934 |
| 1,972,948 | Payne | Sept. 11, 1934 |
| 2,041,858 | Pfirrmann | May 26, 1936 |
| 2,247,097 | Menshih | June 24, 1941 |
| 2,289,329 | Prickett | July 7, 1942 |
| 2,303,717 | Arveson | Dec. 1, 1942 |
| 2,338,606 | Voorhees | Jan. 4, 1944 |
| 2,398,489 | Arveson | Apr. 16, 1946 |
| 2,435,158 | Read | Jan. 27, 1948 |
| 2,444,832 | Krebs | July 6, 1948 |
| 2,517,900 | Loy | Aug. 8, 1950 |

FOREIGN PATENTS

| Number | Country | Date |
|---|---|---|
| 660,776 | Great Britain | Apr. 19, 1948 |